Jan. 18, 1966  K. N. HASENBANK  3,229,452
RIDING MOWER WITH INTERLOCK SYSTEM OF SAFETY SWITCHES
Filed Sept. 17, 1963  5 Sheets-Sheet 1

INVENTOR
KENNETH N. HASENBANK
BY Williamson
& Palmatier
ATTORNEYS

United States Patent Office 3,229,452
Patented Jan. 18, 1966

3,229,452
RIDING MOWER WITH INTERLOCK SYSTEM OF SAFETY SWITCHES
Kenneth N. Hasenbank, Minneapolis, Minn., assignor to Toro Manufacturing Corporation, Minneapolis, Minn., a corporation of Minnesota
Filed Sept. 17, 1963, Ser. No. 309,510
2 Claims. (Cl. 56—25.4)

This invention relates to self-propelled riding type power mowers.

Riding type power mowers are potentially hazardous to the operator thereof and other persons in the immediate vicinity thereof. One potential source of danger is the cutter blade, which can cause injury to the operator if it is rotating while he is getting on or off the vehicle and which can cause injury to others, particularly children who might approach the mower when left unattended while the blade is still rotating. Another potential source of danger and damage relates to the engagement and disengagement of the vehicle drive mechanism from the motor. The operator may forget to disengage the vehicle drive from the motor before leaving the mower or he may be inadvertently thrown from the vehicle while it is still in drive, the vehicle thus being left free to continue to move while unattended. Also, most riding mowers do not have automatic starters, and the engine must be manually cranked and started while the operator is dismounted. If the drive is not in neutral or disengaged, or the cutter is not disengaged, when the engine is started, a potentially hazardous situation is presented.

Therefore, an important object of this invention is a riding type power mower which incorporates novel and unique safety features not previously available on prior art devices, which obviate the aforementioned problems.

Another object is to provide a riding type mower in which the propulsion wheels and the cutter are automatically stopped if the operator leaves his seat while the engine is running and either the drive or cutter are still engaged.

Another object is to provide a riding type power mower with a novel interlock system in which the motor or engine providing the source of power for the vehicle is automatically shut off when the operator leaves his seated position on the vehicle if the cutter is still engaged and being driven.

Still another object is to provide a riding type mower with a novel interlock system in which the motor is automatically sut off when the operator leaves his seated position on the vehicle if the drive mechanism is still drivingly engaged with the motor.

Still another object is to provide a riding type mower with a novel interlock system in which the motor is automatically shut off when the operator leaves his seat if either the cutter mechanism or the vehicle drive mechanism or both are still drivingly engaged with said motor.

Another object is to provide a riding type mower which cannot be started when the operator is dismounted unless the drive is in neutral or disengaged.

Another object is to provide a riding type mower which cannot be started when the operator is dismounted unless the cutter is disengaged.

Still another object is to provide a riding type mower with means for braking the cutter and bringing same to a complete stop immediately after the cutter is disengaged from the motor.

Still another object is to provide a riding type mower with novel cutter disengagement and braking mechanism which sequentially disengages and brakes the cutter by means of a single manipulation of said mechanism on the part of the operator, and which automatically brakes the cutter immediately after disengagement thereof.

Still another object is to provide a riding type power mower with a novel transmission and braking system which is superior to those previously provided on prior art devices and which enables the operator to sequentially disengage the transmission and brake the vehicle through the sequential operation by the operator of a single control element.

These and other objects and advantages of this invention will more fully appear from the following description made in connection with the accompanying drawings wherein like reference characters refer to the same or similar parts throughout the several views, and in which.

Reference is now made to the accompanying drawings for a more detailed description and better understanding of this invention.

The riding type power mower illustrated in the accompanying drawings includes a front frame assembly A on which is mounted front steering wheels W and an upwardly and rearwardly extending steering handle H operatively connected to said wheels. The illustrated vehicle also includes a rear end assembly which includes a rear frame assembly or housing B on which is mounted rear propulsion wheels W', an engine E for driving said vehicle and the cutter mechanism carried thereon, and a seat S on which the vehicle operator sits to operate the vehicle. The rear end assembly also includes a cutter control lever C located on the left side of the vehicle and a shift lever L located on the right side of the vehicle for shifting the vehicle into reverse, neutral or forward drive. The front and rear end assemblies are interconnected by means of an elongate frame member F on which is mounted the throttle or control lever T. Suitable cutter mechanism indicated in the entirety by the letter D is mounted on and suspended from the mower by means of push rods R connected to the rear frame housing B and suspension rods R' supported by the front frame assembly A.

The cutter drive mechanism of this invention includes a vertically disposed cutter spindle jack shaft 15 located beneath the seat S, which jack shaft has drivingly mounted thereon an upper pulley 16 and a lower pulley 17. The jack shaft 15 is drivingly interconnected with the engine E by means of a belt 18 which is trained about the upper pulley 16 of the jack shaft and the engine pulley 19 which is mounted on the vertical engine shaft and driven directly by the engine. The jack shaft is drivingly connected with the cutter unit D by means of a drive belt 20 which is trained about the lower pulley 17 and the pulley 21 of the cutter unit, which pulley is drivingly engaged with the cutter blade G.

Figure 2:
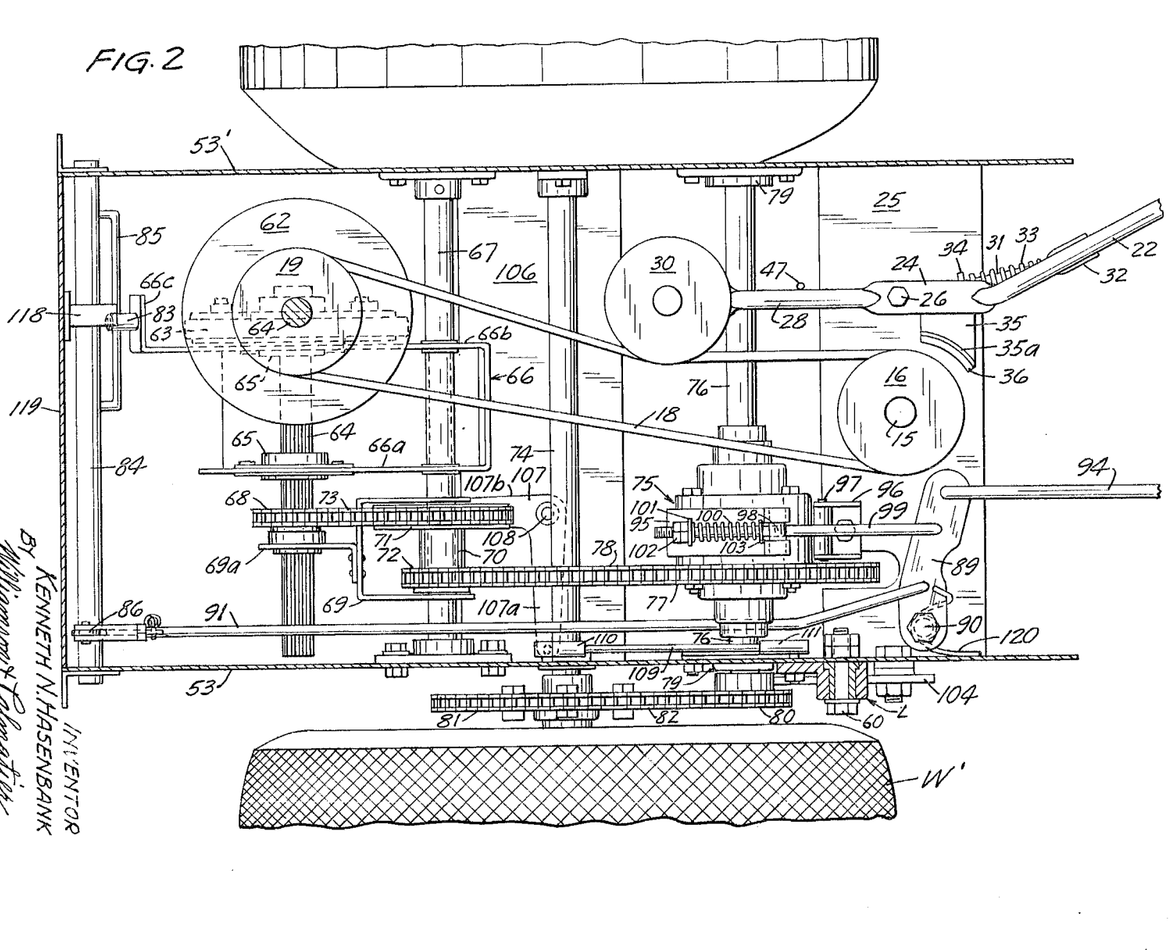
FIG. 2 is a top plan view on an enlarged scale of the rear end assembly of FIG. 1 with the upper portion removed.
Figures 3, 13:
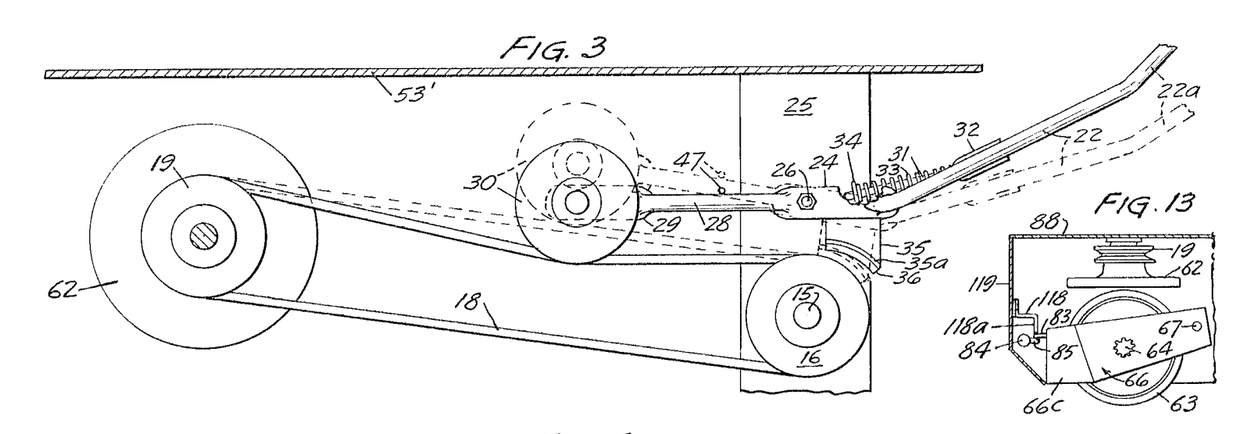
FIG. 3 is a detailed top plan view on an enlarged scale of the cutter control mechanism of this invention.
FIG. 13 is a diagrammatic side view showing the transmission in neutral position.
Figures 4, 14:
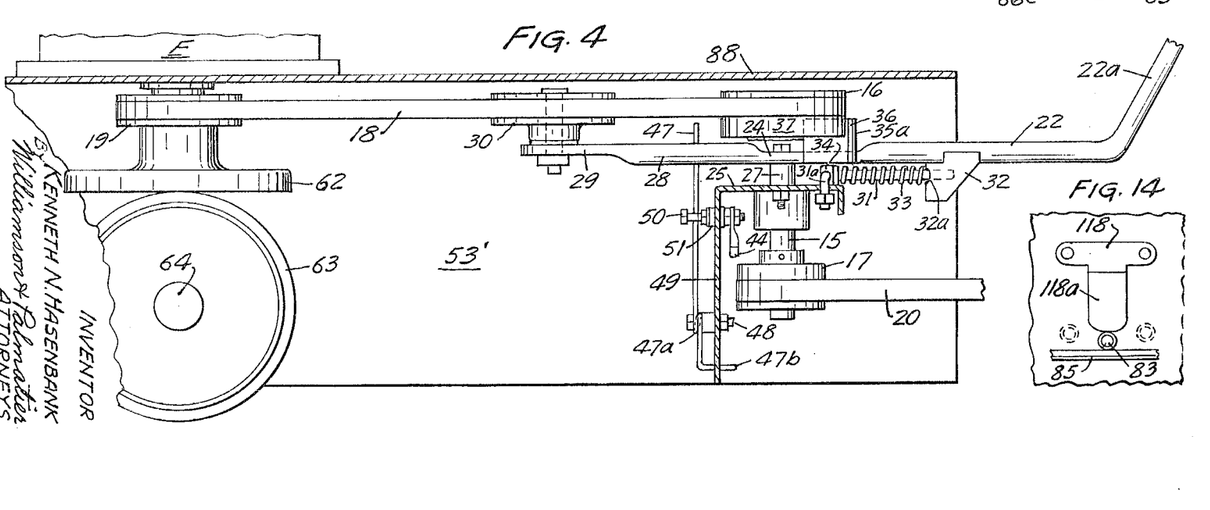
FIG. 4 is a side elevational view of FIG. 3.
FIG. 14 is a diagrammatic end view of FIG. 13.
Figure 5:
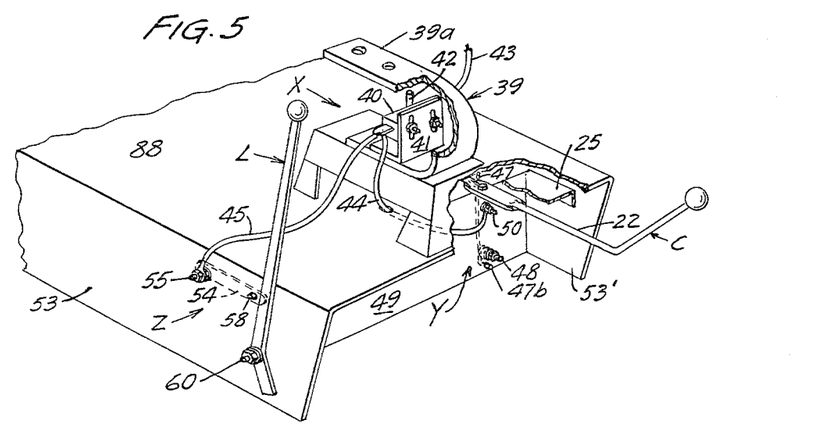
FIG. 5 is a detail perspective view of a portion of the rear end assembly showing the interlock system of this invention.

A cutter control unit is provided for selectively drivingly engaging and disengaging the engine and the cutter unit, said unit being best illustrated in FIGS. 3 and 4. This unit includes the aforeemntioned cutter control lever C. This lever C includes a forwardly extending horizontal handle portion 22, the forward end of which is bent upwardly as at 22a to make it readily accessible to the operator, the outer end of the handle having a knob 23 attached thereto for convenience in manipulating same. The handle extends angularly outwardly and forwardly when in cutter engaging position. The lever assembly C also includes an intermediate horizontal portion or link 24 which is rigidly secured to the rear end portion of the handle 22 and angularly offset therefrom to prevent the handle from swinging too far inwardly when moved to disengaging position. The link 24 is pivotally attached to and mounted on the horizontal transverse supporting plate 25 of the rear housing B by means of pivot bolt 26, which bolt passes through a tubular spacing element 27 attached to the underside of the intermediate portion 22, the lower end of the spacer element pivotally resting on and supporting plate 25 to maintain the control lever C in spaced relationship with respect thereto. The control lever C also includes a rear portion or arm 28 which is rigidly secured to the rear end portion of the intermediate link 24 and extends rearwardly therefrom in longitudinal alignment therewith, said rear arm 28 having an apertured pulley mounting bracket 29 rigidly secured to the rear end portion thereof, on which bracket an idler pulley 30 is rotatably mounted, which pulley is adapted to engage the belt 18 connecting the engine and cutter spindle jack shaft. The idler pulley 30 is adapted to be swung towards and away from the belt 18 for respectively tightening and loosening said belt and respectively drivingly engaging and disengaging the engine and cutter jack shaft in response to the pivotal movement of the control lever C about the pivot bolt 26 in response to shifting or swinging of the handle 22 thereof between engaged and disengaged position. The cutter control lever and its idler pulley are shown in cutter engaging position in FIG. 2 and in the solid line position of FIG. 3, the broken line position of FIG. 3 showing same in cutter disengaging position. Thus, to drivingly engage the engine and the cutter jack shaft, the idler pulley 30 is swung inwardly against the belt 18 to tighten same sufficiently to drivingly engage pulleys 16 and 19 by pushing or swinging the handle 22 of the lever C outwardly or to the left as viewed from above to engaged position. To disengage the engine and the cutter jack shaft and thereby deactivate the cutter unit, the idler pulley is swung outwardly away from the belt 18 a sufficient distance to permit the belt 18 to slacken enough to such an extent that there is no longer a driving connection between the engine pulley 19 and the upper pulley 16 of the cutter jack shaft. This disengaging movement of the idler pulley is accomplished by swinging the handle of the lever C inwardly or to the right as viewed from above from the engaged positions of FIGS. 2 and 3 to the disengaged broken line position of FIG. 3.

In order to maintain the cutter control lever C in engaged or disengaged position, an overcenter spring assembly is provided. This assembly includes a spring supporting rod 31, the rearward end of which is bent downwardly as at 31a, which bent portion is pivotally mounted on the supporting plate 25. The handle 22 of the control lever C has a bracket 32 secured to the underside thereof, said bracket being provided with a rearwardly facing opening 32a through which the forward end of the pivot rod 31 extends, the rod 31 being freely movable relative to the bracket 32. A helical compression spring 33 is coiled about its supporting rod 31. The rear end of the spring bears against a stop plate 34 carried by the rear end portion of the rod 31. The forward end of the spring bears against the bracket 32, said spring continuously applying pressure against said bracket and pushing outwardly against the handle 22. The rod 31 pivots simultaneously with the shifting of the lever C between engaged and disengaged positions and in each of said positions the spring 33 biases the lever C towards and holds it in each of said respective positions. The handle 22 and its bracket 32 are disposed on opposite sides of the centerline of the pivot axis 31a of the spring rod when in engaged and disengaged positions in order to provide the overcenter spring action and biased holding of the handle in each of said positions.

Since the cutter blade continues to rotate in free wheeling fashion for a while after being disengaged from the engine, this free wheeling condition creates a potential hazard to the operator if he leaves the vehicle immediately after disengaging the cutter. Therefore, brake means are provided for bringing the cutter to an abrupt stop immediately after the cutter has been disengaged from the engine. In the illustrated embodiment, the cutter braking means comprise a brake shoe 35 which is attached to the intermediate link 24 of the lever C and extends inwardly therefrom. The brake shoe has a concavely curved vertically disposed face 35a to which is secured a brake pad 36 formed of any suitable friction material. A cylindrical brake drum 37 is provided on the lower portion of the upper jack shaft pulley 16 in opposition to the vertical face of the brake shoe and pad carried thereon. When the cutter control lever C is in engaged position, the brake shoe and pad are spaced from and disengaged from the brake drum as in FIG. 2 and the solid line position of FIG. 3. When the control lever C is shifted to the disengaged position, the brake shoe is moved simultaneously with the lever C inwardly into engagement with the brake drum as shown by the broken line position of FIG. 3 so as to engage same immediately after the belt 18 has been sufficiently slackened by the outward shifting of the idler pulley 30 to disengage the cutter and the engine whereby the disengaged cutter is immediately brought to a complete stop by the braking action thereon. The overcenter biasing action of the spring assembly can complete the movement of the lever C to either engaged or disengaged position once the handle 22 has been manually moved from one position past the center line of the pivot axis of the spring rod. The biasing action of the spring is normally sufficient to achieve adequate braking action on the pulley 16. However, because of the integral or unitary interconnection between the lever C and the brake shoe, the operator can, if he desires, apply manual pressure to the lever C to achieve the prompt braking action desired. When the lever C is shifted back to engaged position, the brake shoe and pad move away from and out of engagement with the brake drum in advance of the reengagement of the cutter with the engine. Thus, the cutter control unit hereinbefore described provides a simple and efficient means for controlling the engagement and disengagement of the cutter with the engine, and also provides for positive braking and stopping of the cutter immediately after it has been disengaged.

The mower of this invention also provides a novel engine interlock system which automatically shuts off the motor if the operator leaves the mower while the cutter is still engaged or the transmission is still drivingly engaged.

The interlock system of the illustrated embodiment incorporates a seat operated switch unit X, a switch unit Y operated by the cutter control unit and a switch unit Z operated by the shift lever L. The seat switch X is in circuit with the engine and with each of the other switches Y and Z, which switches Y and Z are in turn in circuit with the vehicle frame. This interlock system provides a circuit for grounding and stopping the engine if either the cutter or vehicle transmission are drivingly engaged when the operator leaves his seat, and prevents starting of the engine when the seat is unoccupied if either the cutter or transmission are drivingly engaged. Interlock systems utilizing only switches X and Y or X and Z are within the scope of this invention. However, the safest mower is providide by utilizing all three switches in the manner herein described.

The seat switch X is open when the operator is seated and automatically closes when the operator leaves the seat. The cutter switch is open when the cutter is disengaged from the engine and is closed when engaged therewith. The shift switch Z is open when the shift lever L is in neutral position and the transmission is not drivingly engaged with the engine and the switch Z is closed when the shift lever is in either forward or reverse drive position and the transmission is drivingly engaged with the engine. Thus, when both switches X and Y are closed or when both switches X and Z are closed, the engine is grounded and stopped. When the operator is seated on the vehicle, the switch X is held open permitting the engine to run when either the cutter or transmission or both are drivingly engaged and either or both of their respective switches Y and Z are closed. However, if either the cutter or the transmission are drivingly engaged when the operator leaves his seat, the grounding circuit is automatically closed through the closing of either of the switches Y or Z and the seat switch X so that the engine automatically shuts off in such event. Thus, the engine will continue to run when the operator leaves his seat only if both the cutter and the transmission are both disengaged.

The seat S is mounted on the supporting housing 38 of the rear housing B by means of a U-shaped seat spring 39, the upper leaf or leg 39a being resilient and adapted to swing up and down in response to the operator seating himself on and removing himself from the seat S.

The seat switch unit X is mounted beneath the seat between the legs of the seat spring 39. The switch unit X includes a microswitch 40 which is mounted on the seat spring by means of a mounting bracket 41. The microswitch is provided with a vertically reciprocable spring loaded plunger 42 for opening and closing the microswitch 40, the upper end of said plunger 42 being engaged with the upper leg 39a of the seat spring. One side of the microswitch has a lead wire 43 connected thereto which is also connected to the engine. The other side of the microswitch has lead wires 44 and 45 connected thereto which connect the microswitch 40 with the cutter switch Y and shift switch Z respectively. When the operator is seated on the seat S, the weight of the operator depresses the leg 39a of the seat spring and the plunger 42 and holds the microswitch open. When the operator leaves the seat, the resiliency of the seat spring causes the leg 39a thereof to swing upwardly, the plunger 42 following same under the influence of the plunger biasing spring which continuously biases the plunger upwardly towards switch closing position, the plunger when raised causing closing of the microswitch 40.

The cutter switch unit Y is located beneath and to the left side of the seat. This switch unit includes an elongate vertically disposed spring rod 47 which is located on the outer side of and immediately adjacent the rear arm 28 of the cutter control lever C so as to be actuated thereby in a manner hereinafter to be described. The lower end portion of the rod is coiled as at 47a to provide the desired spring tension in the rod and to form an eye for receiving a mounting screw 48 by means of which the rod 47 is attached to the inside of the vertical transverse front supporting frame panel 49 of the rear housing B. The lower end portion of the rod beyond the coiled eye terminates in a laterally extending portion 47b which is anchored against movement by insertion thereof through a suitable aperture provided in the frame panel 49.

A metal screw 50 is provided which serves as one of the contacts of the switch Y, said screw being adapted to be engaged by the rod 47. This screw 50 is mounted on the frame member 49 by inserting same through a suitable opening provided in the frame, the screw being insulated from the frame by means of insulating washers or bushings 51 and 52 respectively, which are formed of any suitable non-conductive material such as nylon. The outer end portion of the contact screw 50 has the other end of lead wire 44 conected thereto for connecting the switch Y and specifically the screw 50 with the microswitch 40 of the seat switch X.

The spring rod 47 is located inside of the frame member 49 and is biased inwardly towards engagement with the contact screw 50, the rod 47 serving as the other contact of the switch Y. The rod is in engine grounding relationship with the frame and the contact screw 50 is insulated from the frame. Therefore, when the contact screw 50 and rod 47 are engaged, the swich Y is closed and provides a closed circuit between the frame and the seat switch X. When the rod 47 and contact screw 50 are not engaged, the switch Y is open and will not cause grounding of the engine and stopping thereof when the seat switch X is closed.

Figure 7:
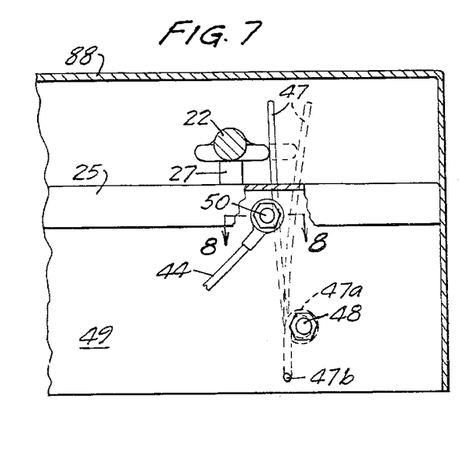
FIG. 7 is a front view on an enlarged scale of the cutter control switch of the interlock system with portions broken away.
Figure 8:
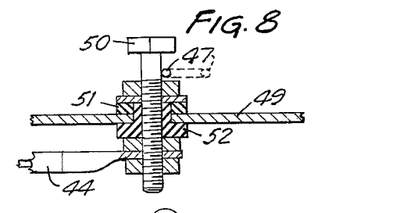
FIG. 8 is a sectional view of the cutter control switch taken on the line 8—8 of FIG. 7.
Figure 9:
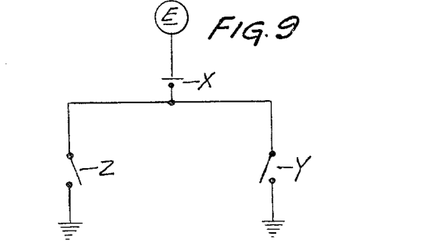
FIG. 9 is a schematic wiring diagram of the interlock system.
Figure 10:
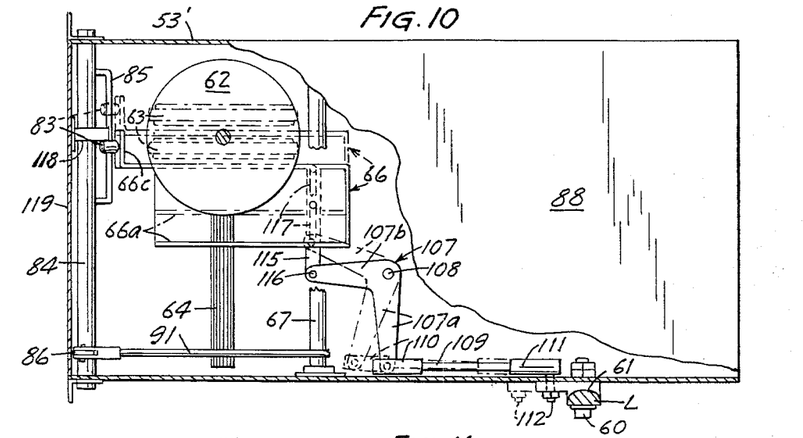
FIG. 10 is a top plan view of a portion of the rear end assembly showing the shifting mechanism.
Figure 11:
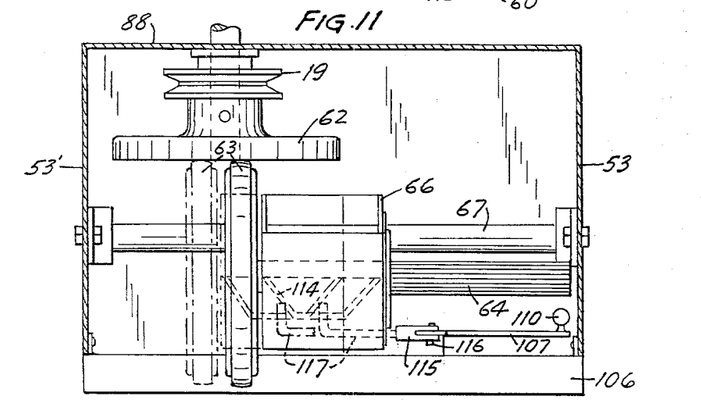
FIG. 11 is a rear elevational view of FIG. 10 with the rear wall of the rear housing removed.

The cutter switch Y is adapted to be controlled and opened and closed by the cutter control unit hereinbefore described in such fashion that the switch Y is open when the cutter is disengaged and closed when the cutter is engaged. The opening and closing of the switch Y in response to the disengagement and engagement of the cutter respectively is accomplished by the action of the cutter control lever C and more specifically the rear arm 28 thereof on the spring rod 47. When the control lever C is in cutter engaging position, the rod 47 is held against the contact screw 50 as shown in the solid line position of FIGS. 7 and 8 by the spring tension of the rod, the engagement of the rod 47 with the screw 50 closing the switch Y and permitting grounding and stopping of the engine if the seat switch X is closed by the operator leaving the vehicle while the cutter is engaged. When the cutter lever C is swung to the disengaged position, the rear arm 28 thereof swings outwardly, and as it swings outwardly, it engages the upper end of the spring rod 47 and moves it outwardly away from and holds it out of engagement with the screw 50, thereby opening the switch Y so that no grounding of the engine will take place through the switch Y if the operator leaves the vehicle while the cutter is disengaged. When the cutter lever C is returned to engaged position, the rear arm 28 thereof swings inwardly and the spring tension on the rod 47 causes it to follow the arm 28 of the lever and swing inwardly to return to engagement with the screw 50, and thereby again close the switch Y.

The shift switch Z is located on the right side of the seat and mounted on the vertical longitudinally extending right side frame member 53 of the rear housing B.

Figure 6:
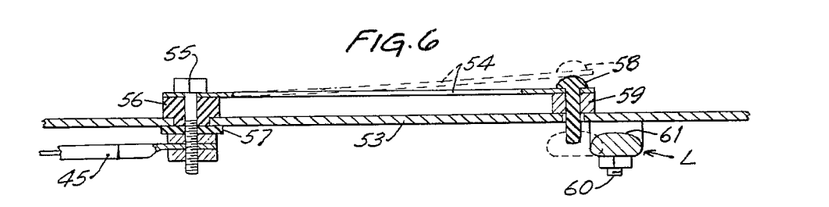
FIG. 6 is a detail sectional view of the shift lever switch unit of the interlock system taken approximately on the line 6—6 of FIG. 5.

The shift switch Z includes a spring bar 54 located on the inside of the frame member 53. One end of the spring bar 54 is attached to the frame member 53 by means of a metal screw 55, which screw extends through a suitable opening provided in the frame member 53, said screw being insulated from the frame by means of bushings or washers 56 and 57 formed of any suitable non-conductive material such as nylon. The outer end of the screw 55 is connected to one end of the lead wire 45, the other end of said lead wire being connected to the microswitch 40 of the seat switch X so as to place the switches X and Z in circuit with each other. The other end of the spring bar 54 has a screw 58 formed of any suitable nonconductive material such as nylon attached thereto, the forward end of said screw extending through a suitable opening provided in the frame member 53 so as to extend laterally outwardly therefrom. A metal nut 59 is mounted on the screw 58 and located on the inner side of the frame 53 and in engagement with the spring bar 54. The tension of the spring bar normally biases the end thereof carrying the nonconductive screw 58 and nut 59 towards the frame 53 so as to hold the nut 59 in engagement with the frame 53. When the nut 59 is in engagement with the frame, the switch Z is closed and in grounding relationship with the frame, providing a closed grounding circuit between the seat switch X and the frame, the circuit being provided through the nut 59, spring bar 54, screw 55 and lead wire 45. The switch Z is opened by moving the nut 59 out of contact with the frame 53 to the open broken line position of FIG. 6 by action of the shift lever L on the screw 58 in the manner hereinafter described.

In the illustrated embodiment, the shift lever L is pivotally connected to the side frame member 53 by pivot bolt 60 for forward and rearward shifting movement thereof. Intermediate the extreme forward and rearward ends of travel of the lever L is an intermediate neutral position. When the lever L is in this neutral position, the transmission is not drivingly engaged with the engine. The screw 58 of the switch Z is located at this neutral position so as to be engaged by the shift lever L when it is in neutral position.

The portion of the inner face of the shift lever L facing the screw 58 is slightly rounded or convexed as at 61 to enable the lever to freely pass over the screw 58 in either direction. When in the neutral broken line position of FIG. 6, the lever L engages the outer end of the screw 58 and pushes same inwardly and thereby pushes the nut 59 away from and out of engagement with the frame 53 and thereby opens the switch Z so that the motor will not be grounded and stopped through the switch Z if the operator leaves his seat when the shift lever is in neutral and the transmission is drivingly disengaged.

When the shift lever is shifted either forwardly or rearwardly from neutral position to provide forward or reverse drive respectively, it moves out of engagement with and releases the screw 58, which screw is then pushed outwardly and the nut 59 returned to engagement with the frame 53 by the spring action of the spring bar 54, whereby the switch Z is again closed to provide a grounding circuit through the switch Z for shorting and stopping the engine if the operator leaves his seat while the transmission is drivingly engaged.

Thus, if either the cutter or the transmission are drivingly engaged, or if both of them are engaged, their respective switches Y and Z will be closed when they are so engaged and will cause grounding and stopping of the engine automatically when the operator leaves his seat and thereby closes the seat switch X to complete the closing of the grounding circuit. While the operator remains on the seat, the seat switch X remains open, and no grounding of the engine can occur by closing either or both of the switches Y and Z. However, to prevent grounding and stopping of the engine when the operator leaves his seat, both the cutter and the drive must be drivingly disengaged in order for their respective switches Y and Z to be open and prevent grounding of the engine therethrough.

Since the seat switch X is closed when the seat is unoccupied, the engine cannot be started by a dismounted operator unless both the cutter and transmission are drivingly disengaged and their respective switches Y and Z are open.

The mower of this invention also includes a novel drive, clutch and brake system which are described hereinafter as follows. The drive system includes a friction drive plate 62 which is mounted on the lower end of the engine shaft directly beneath the engine drive pulley 19 for rotation of the friction plate in a horizontal plane about the vertical axis provided by the engine shaft.

The means for transmitting the drive from the friction plate to the propulsion wheels W' includes a spring-loaded friction driven wheel or disk 63 which is disposed in a vertical plane beneath the friction plate 62 at right angles thereto, the periphery of the disk 63 being adapted to engage the lower face of the driven plate 62 so as to be driven thereby through its frictional engagement therewith. The disk 63 is adapted to be swung upwardly and downwardly in a vertical plane into and out of engagement with the plate 62 in the manner hereinafter described. The disk 63 is mounted on a horizontal transverse splined shaft 64 in driving engagement therewith. The splined shaft 64 is journaled in suitable bearings 65 and mounted on and supported by an open-topped channel shaped longitudinally extending bracket 66. The bracket 66 is rotatably and slidably mounted on a stationary non-rotatable dead supporting shaft 67 for swinging movement of the bracket 66 and the splined shaft 64 and driven disk 63 carried thereon upwardly and downwardly about the axis provided by the shaft 67 to enable the disk 63 to be raised and lowered into and out of engagement with the drive plate 62. The dead shaft 67 freely extends through the opposing sides 66a and 66b of the bracket 66 and is supported at its respective ends by the side frame members 53 and 53' of the rear housing B. The bracket 66 is not only rotatably mounted on shaft 67, but is also slidable longitudinally thereof to accomplish lateral shifting of the driven disk 63 relative to the driving plate 62 and shifting of speeds in a manner hereinafter described.

A sprocket 68 is mounted on the splined shaft 64 so as to be rotatably driven thereby, the shaft 64 being longitudinally reciprocable relative to said sprocket. A U-shaped bracket 69 is rotatably mounted on the dead shaft 67 and has enclosed therewithin a double sprocketed hub 70 which is rotatably mounted on the dead shaft 67, said hub having secured thereto a large sprocket 71 and a smaller sprocket 72. The bracket 69 is held against longitudinal movement on the dead shaft 67 and is provided with a rearwardly extending arm 69a having a bifurcated rear end portion for rotatably receiving the sprocket 68, the arms of said end portion seating in an annular groove formed on the sprocket 68 so as to hold the sprocket 68 against axial movement when the splined shaft 64 is longitudinally shifted to vary the speed in a manner hereinafter to be described, the sprocket 68 being freely rotatable relative to the arm 69a. The sprockets 68 and 71 are drivingly interconnected by means of a chain 73 trained thereabout. The drive wheels W' are rotatably mounted on an axle shaft 74 located forwardly of the dead shaft 67 and extending between and through the side frame members 53 and 53'. A conventional differential assembly 75 is located forwardly of the axle shaft 74 and has drive shafts 76 extending from opposite ends thereof. A sprocket 77 is mounted on the differential housing and drivingly engaged therewith, said sprocket 77 being driven by means of a chain 78 trained about sprocket 77 and the small sprocket 72 mounted on the dead shaft 67. The differential shafts 76 extend through and are suported by the side frame members 53-53' of the vehicle chassis and are journaled in suitable bearings 79. The outer ends of the shafts 76 have sprockets 80 drivingly mounted thereon and located outside the frame members 53-53'. These sprockets 80 are drivingly connected to sprockets 81 which are rotatably mounted on the axle shaft 74 and drivingly connected to the propulsion wheels W', the sprockets 80 and 81 being drivingly interconnected by a drive chain 82.

Figure 1:
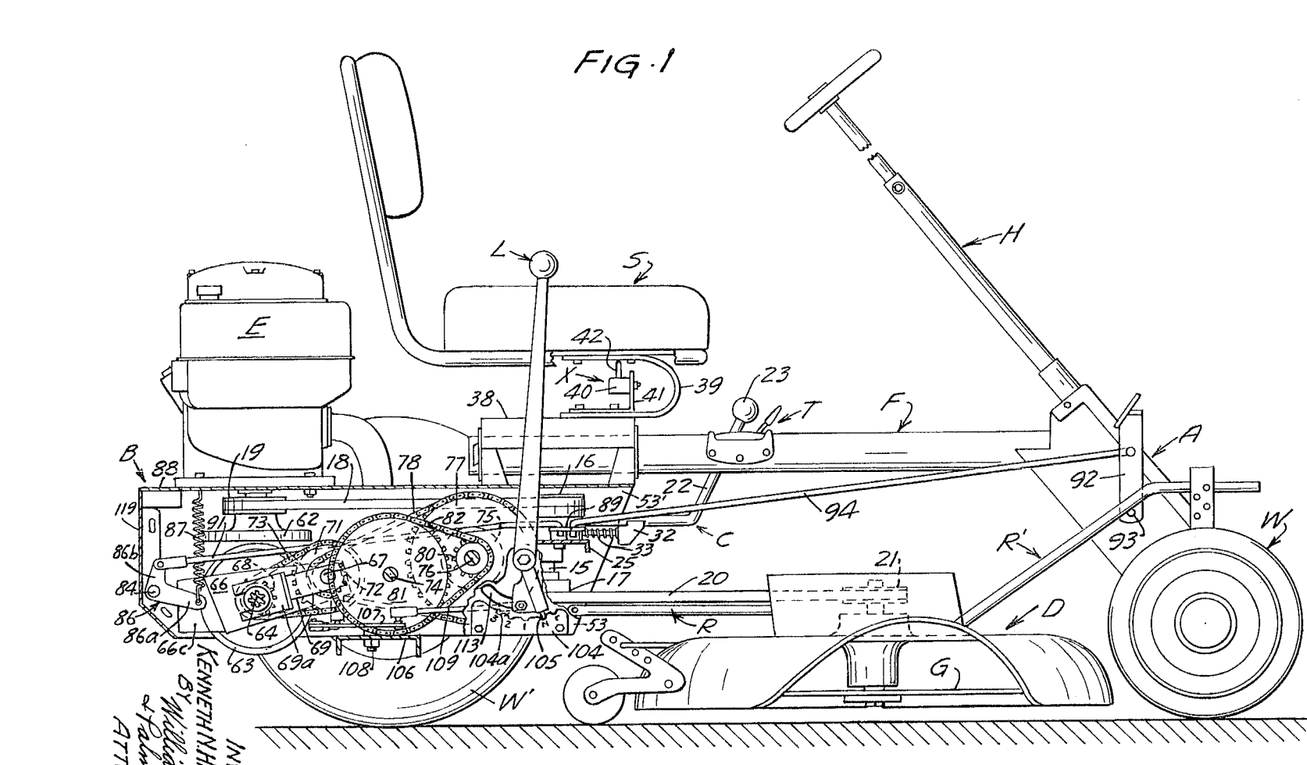
FIG. 1 is a side elevational view with portions broken away of a riding type mower embodying this invention.

A combination or operatively interconnected clutch-brake system (shown in FIGS. 1 and 2) is provided for engaging and disengaging the transmission and specifically the driven disk 63 with the drive plate 62 and for braking the vehicle after the transmission has been disengaged. The bracket 66 which carries the splined shaft 64 and disk 63 has a flange 66c extending laterally from the rear end of the side 66b thereof, said flange having mounted thereon a rearwardly extending pivot roller 83 which serves as a follower element for raising and lowering the disk 63.

A rotatable rod 84 is located at the rear of the vehicle behind the splined shaft 64, which rod extends between and is rotatably supported by the side frame members 53–53' of the chassis. The rod 84 has an elongate bail 85 longitudinally mounted thereon, which bail underlyably engages and supports the pivot roller 83 and is adapted to swingably raise and lower said pivot roller, its bracket 66, and the disk 63 in response to rotation of the rod 84.

The rod 84 has a bell crank 86 secured thereto for rotating same. The lower arm 86a of the bell crank has a spring 87 connected thereto, the upper end of said spring being connected to the horizontal supporting plate 88 of the rear housing B, said spring being adapted to continuously bias the arm 86a upwardly and thereby continuously bias the bail 85 and the disk 63 upwardly and normally hold the disk 63 in engagement with the plate 62.

The lowering of the disk 63 out of engagement with the plate 62 to disengage the transmission is accomplished by rotating the rod 84 forwardly so as to lower the bail 85, the roller 83 automatically following the bail downwardly and thereby dropping the disk 63 out of engagement with the plate 62 through the swingable mounting of the bracket 66 on the dead shaft 67.

To accomplish this lowering of the bail and disengagement of the transmission disk 63, a link or arm 89 is provided which is pivotally mounted on the frame member 25 by means of a pivot pin 90. A connecting rod 91 extends between and is pivotally connected at its respective ends to the upper arm 86b of the bell crank and the arm 89. A foot operated clutch-brake pedal or lever 92 is pivotally mounted to the front frame assembly A of the vehicle by pivot pin 93. Another connecting rod 94 extends between and is pivotally connected at its respective ends to the arm and pedal 92. Thus, when the pedal 92 is pushed forwardly by the operator, it pulls the rod 94 forwardly and rod 94 in turn pulls and swings the arm 89 forwardly about its pivot pin 90. This forward movement of the arm pulls the rod 91 forwardly, which rod pulls the upper arm 86b of the bell crank forwardly and downwardly, causing the rod 84 to rotate forwardly and the bail 85 carried thereon to swing downwardly and thereby lower the follower 83 and bracket 66 and release the transmission disk 63 from engagement with the plate 62. When the pedal 92 is released by the operator, the upward biasing action of the spring 87 on the bell crank 86 automatically returns the disk 63 to engagement with the plate 62.

To brake the vehicle, a brake band 95 is provided which encircles the housing of the differential 75. One end of the brake band is anchored by means of a bracket 96 which is secured to the frame member 25, the brake band being connected to the bracket by means of a roll pin 97.

The other end of the brake band is provided with an apertured pin 98 through which a brake rod 99 freely extends for longitudinal shifting movement of the brake rod relative to pin 98. The rear end portion of the brake rod has a helical spring 100 telescopically mounted thereon, the rear end of the spring being engaged and held by a stop washer 101 which in turn is held in place by nuts 102 threadedly mounted on the brake rod. The forward end of the spring engages and bears against another washer 103, which washer is held against movement by the brake band and its pin 98. Thus, the spring 100 continuously biases the brake rod 99 rearwardly or toward brake releasing position. The forward end of the rod 99 is pivotally connected to the pivotally mounted arm 89. Thus, when the operator presses on the combination clutch-brake pedal 92, the forward pivotal swinging movement of the arm 89 pulls the brake rod 99 forwardly, and thereby progressively draws the brake band tight about the differential housing to stop same and thereby stop the propulsion wheels W'. When the pedal 92 is released, the brake spring 100 pulls the brake rod rearwardly and progressively releases the brake band from engagement with the differential. The clutch linkage and brake linkage are so designed that the brake band does not produce any braking effect on the differential until after the transmission has been disengaged. Thus, initial depression of the pedal 92 effects disengagement of the transmission and further depression of the pedal 92 then causes the desired vehicle braking action to take place.

The speed of the vehicle is controlled by moving the disk 63 in relation to the axis of the plate 62. High speed occurs when the disk 63 is in engagement with the plate 62 at its outer permiter, and a gradual reduction in speed, neutral, and reverse speeds occur as the point of engagement is successively moved radially inwardly on plate 62 and then slightly overcenter. This shifting of the disk 63 relative to the plate 62 to vary the speed is accomplished by shifting of the shift lever L in the manner hereinafter described.

A shift quadrant plate 104 is mounted on the outside of the right frame member 53, said plate having a series of depressions 104a formed in the upper concavely curved edge thereof. The lower end of the shift lever L is provided with a spring loaded pawl 105 which seats in the depressions 104a to hold the shift lever in any of the desired speed positions. An elongate transversely disposed supporting plate 106 extends between and is secured to the side frame members 53–53'. A bell crank 107 is pivotally mounted on the supporting plate 106 by means of a pivot pin 108 secured thereto and depending therefrom and extending through a suitable aperture in the supporting plate 106.

A connecting rod 109 extends between and is pivotally connected at its respective ends to the arm 107a of the bell crank and the lower end of the shift lever by means of ball-socket joint assemblies 110 and 111 respectively. The ball-socket joint 111 is connected to the shift lever by means of a bolt 112 which extends through and is slidable in an arcuate slot 113 formed in the frame member 53.

A bail 114 depends from and is secured to the bracket 66. This bail and the bell crank 107 are operatively linked together by a yoke 115 which is pivotally connected to the arm 107b of the bell crank by means of a yoke pin 116. The yoke has a rod 117 connected thereto, the outer end of which is bent upwardly and pivotally engaged with the bail 114.

Thus, shifting of the shift level L causes swinging of the bell crank 107 which in turn causes transverse shifting movement through the yoke 115 and yoke rod 117 of the bracket 66 and the splined shaft and disk 63 carried thereon, in order to shift the position of the disk 63 relative to the axis of the drive plate 62.

In the illustrated embodiment, the shift mechanism provides three forward speeds, neutral, and one reverse speed. The position of the shift lever L for each of these speeds is indicated by the indicia on the quadrant plate 104 adjacent the lever holding depressions 104a thereof. Thus, neutral position is indicated by N, reverse position by r, and the three forward speeds by numerals 1, 2 and 3 which represent low, intermediate and high speed respectively. For forward driving, the disk 63 is to the left of the axis of plate 62 when viewed from above. In neutral, the disk 63 is in alignment with the axis of plate 62, and in reverse, the disk 63 is to the right of the axis of plate 62.

It is preferable that the disk 63 not engage the plate 62 when in neutral position, to prevent uneven wearing of the periphery of the disk 63 and the formation of flats thereon which would cause the disk 63 to become out-of-round.

Figure 12:
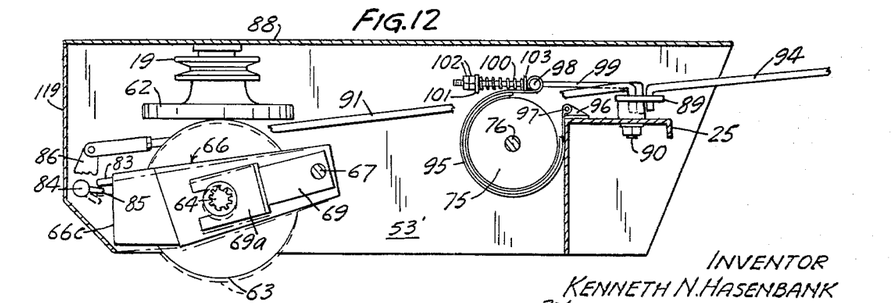
FIG. 12 is a side elevational view of a portion of the rear end assembly showing the vehicle clutch-brake mechanism.

Therefore, a cam 118 is provided which is mounted on the inside of the back wall 119 of the rear housing B, which cam has a downwardly bent lip 118a, the lower edge of which is adapted to overlyingly engage the follower 83 only when the disk 63 is in neutral position and depress same enough to hold the disk 63 out of engagement with the plate 62. When the transmission disk 63 is shifted either to the right or left from neutral to either reverse or forward drive positions, the cam 118 releases the follower 83 to permit it and the disk 63 to rise into engagement with the plate 62 under the influence of spring 87. The cam 118 is disengaged from the follower 83 in FIG. 12, and is shown engaged therewith in FIG. 14. In FIG. 15, the solid line position of follower 83 shows its relationship to the lip 118a of the cam in neutral, and the broken line positions of the follower 83 to the left and right of the solid neutral position illustrate its relative relationship to the cam when the disk 63 is in reverse and forward drive engagement respectively with the plate 62.

To further insure that the arm 89 will swing rearwardly after the clutch-brake pedal 92 is released to enable the brake band to be released and the transmission disk 63 to return to engagement with the plate 62, a torque spring 120 is wound about the pivot bolt 90, one end of said spring being anchored to the front edge of the arm 89, the other end of the spring being anchored to the side frame 53, said spring biasing the arm 89 rearwardly.

To start the mower, the operator must first set the shift lever in neutral position and the cutter control lever in disengaged position in order to open the interlock grounding circuit. Thus, when the engine is started, the transmission and the cutter are drivingly disengeged so that the mower will not move until the operator is properly seated and prevents possible injury to the operator by the cutter blade prior to and during his mounting of the vehicle.

When the operator leaves his seat for any reason while the engine is running, the engine will automatically be stopped unless the operator has first set the shift lever in neutral and disengaged the cutter. Thus, the operator can mount and dismount with perfect safety because of the novel interlock system provided. The mower cannot move unless the operator is seated thereon, and there is no danger associated with leaving the mower unattended, since either the engine will be stopped or the transmission and cutter will not be drivingly engaged.

During operation of the mower, the cutter can be conveniently engaged and disengaged by shifting the cutter lever C back and forth and thereby tightening and loosening the drive belt between the engine and the cutter jack shaft. The cutter brake will immediately stop the cutter blade each time the cutter is disengaged, so that there will be no danger to the operator if he leaves the vehicle immediately after disengaging the cutter.

The dual purpose clutch-brake pedal provides a simple and convenient means for disengaging the transmission and slowing or stopping the vehicle.

The friction drive system is a simple but highly efficient drive system which provides smooth starts and smooth changing of speeds, and enables the shift lever to be used as an aid in braking on steep slopes and hills.

It will, of course, be understood that various changes may be made in the form, details, arrangement and proportions of the various parts without departing from the scope of my invention.

What I claim is:
1. A riding mower having in combination an engine,
   a revolving cutter,
   a jack shaft spaced in substantially parallel relation to the axis of said cutter,
   propulsion wheels,
   transmisison mechanism for drivingly connecting and disconnecting said engine and wheels,
   an endless driving element for drivingly interconnecting said engine and said jack shaft,
   means interconnecting said jack shaft and cutter for driving,
   a pivotally mounted lever swingable between cutter-engaging and cutter disengaging positions and carrying an idler pulley adapted to engage and tighten said endless belt to drivingly engage said engine and jack shaft, said pulley being further adapted to move away from and loosen said belt in one position of said lever,
   a weight depressible seat,
   a first electrical switch in circuit with said engine and responsive to said seat when occupied so as to be opened in such condition and to be closed when said seat is unoccupied,
   a second switch responsive to the swinging of said lever and adapted to be closed when said endless belt is tightened to drivingly engage said engine and jack shaft and adapted to be opened when said lever is in position to cause disengagement of said engine and jack shaft,
   said second switch being in circuit with said first switch and with the frame of the mower whereby the engine is grounded when both of said first and second switches are closed,
   a third switch responsive to the engagement and disengagement of said transmission and engine and adapted to be closed when said transmission and engine are engaged,
   said third switch being also in circuit with said first switch and with the frame of the mower whereby the engine is also grounded when both said first and third switches are closed.

2. The structure and combination as set forth in claim 1, further characterized by a first brake means connected to said swingable lever and movable therewith, and second brake means carried by said jack shaft,
   said first brake means moving into braking engagement with said second brake means when said lever is swung, to cause disengagement of said engine and jack shaft.

References Cited by the Examiner
UNITED STATES PATENTS

| | | | |
|---|---|---|---|
| 2,550,999 | 5/1951 | Hoffman et al. | 180—82.31 XR |
| 2,865,159 | 12/1958 | Mustgrave | 56—25.4 |
| 2,893,501 | 7/1959 | Smith | 180—19 |
| 2,899,793 | 8/1959 | Swisher | 56—25.4 |
| 2,914,131 | 11/1959 | Maurice et al. | 180—82.4 |
| 3,093,948 | 6/1963 | Root | 56—25.4 |
| 3,123,961 | 3/1964 | Kamlukin | 56—25.4 |
| 3,169,358 | 2/1965 | Ertsgaard et al. | 56—25.4 |

ABRAHAM G. STONE, *Primary Examiner.*

T. GRAHAM CRAVER, *Examiner.*

JOE O. BOLT, *Assistant Examiner.*